United States Patent
Agapiou et al.

(10) Patent No.: US 7,323,526 B2
(45) Date of Patent: Jan. 29, 2008

(54) SUPPORTED METALLOCENE-ALKYL CATALYST COMPOSITION

(75) Inventors: Agapios K. Agapiou, Humble, TX (US); Phuong Anh Cao, Old Bridge, NJ (US); Sun-Chueh Kao, Hillsborough, NJ (US)

(73) Assignee: Univation Technologies, LLC, Houston, TX (US)

( * ) Notice: Subject to any disclaimer, the term of this patent is extended or adjusted under 35 U.S.C. 154(b) by 157 days.

(21) Appl. No.: 11/192,935

(22) Filed: Jul. 29, 2005

(65) Prior Publication Data

US 2007/0027027 A1    Feb. 1, 2007

(51) Int. Cl.
    C08F 4/76    (2006.01)
    C08F 4/52    (2006.01)
    B01J 31/38    (2006.01)

(52) U.S. Cl. .................. 526/166; 526/160; 526/170; 526/130; 526/127; 526/943; 526/941; 526/348; 502/103; 502/117; 502/152; 502/125

(58) Field of Classification Search .......... 526/160, 526/170, 943, 901, 129, 130, 166, 127, 941, 526/348; 502/103, 104, 242, 117, 152
    See application file for complete search history.

(56) References Cited

U.S. PATENT DOCUMENTS

| | | | | |
|---|---|---|---|---|
| 5,241,025 A | | 8/1993 | Hlatky et al. | 526/129 |
| 5,283,278 A | * | 2/1994 | Daire et al. | 524/399 |
| 5,418,200 A | * | 5/1995 | Carney et al. | 502/117 |
| 5,466,649 A | * | 11/1995 | Jejelowo | 502/120 |
| 5,473,028 A | * | 12/1995 | Nowlin et al. | 526/114 |
| 5,608,019 A | * | 3/1997 | Cheruvu et al. | 526/129 |
| 5,795,838 A | | 8/1998 | Tsutsui et al. | 502/103 |
| 6,242,545 B1 | | 6/2001 | Jejelowo et al. | 526/160 |
| 6,248,845 B1 | | 6/2001 | Loveday et al. | 526/113 |
| 6,300,436 B1 | * | 10/2001 | Agapiou et al. | 526/154 |
| 6,593,267 B2 | | 7/2003 | Kuo et al. | 502/107 |
| 6,683,016 B1 | * | 1/2004 | Youn et al. | 502/117 |
| 6,852,811 B1 | * | 2/2005 | Carnahan et al. | 526/126 |
| 6,977,283 B1 | * | 12/2005 | Shutt et al. | 526/71 |
| 2005/0003950 A1 | * | 1/2005 | Mink et al. | 502/102 |
| 2005/0054520 A1 | | 3/2005 | Hart et al. | |

FOREIGN PATENT DOCUMENTS

| | | | |
|---|---|---|---|
| EP | 0481 480 A1 | | 4/1992 |
| WO | WO 00/02930 A1 | | 1/2000 |
| WO | WO 00/40623 A1 | * | 7/2000 |
| WO | WO 03/047751 A1 | | 6/2003 |
| WO | WO 2004/094487 A1 | | 11/2004 |

OTHER PUBLICATIONS

Semikolenova, Niva V.; Zakharove, Vladimir A.; "*On the interaction of supported zirconocene catalysts with alkylaluminium co-catalysts*" Macromol. Chem. Phys. 198, 2889-2897 (1997).

Giannetti, Enzo; Nicoletti, Giuseppe M.; Mazzocchi, Romano; "*Homogeneous Ziegler-Natta Catalysis. II. Ethylene Polymerization by IVB Transition Metal Complexes/Methyl Aluminoxane Catalyst Systems*" Journal of Polymer Science: Polymer Chemistry Edition, vol. 23, 2117-2133 (1985).

* cited by examiner

*Primary Examiner*—Vasu Jagannathan
*Assistant Examiner*—Rip A. Lee
(74) *Attorney, Agent, or Firm*—Kevin M. Faulkner; Leandro Arechederra

(57) ABSTRACT

A supported catalyst composition having improved flow properties is disclosed comprising an alkylalumoxane, a metallocene-alkyl an inorganic oxide support having an average particle size of from 0.1 to 50 μm and calcined at a temperature greater than 600° C., and optionally an antifoulant agent and. In one embodiment, the metallocene-alkyl is a Group 4, 5 or 6 metallocene-alkyl, and in another embodiment is a hafnocene-alkyl. Also disclosed is a method of polymerization using such a supported catalyst composition.

19 Claims, No Drawings

SUPPORTED METALLOCENE-ALKYL CATALYST COMPOSITION

FIELD OF THE INVENTION

The present invention relates to supported metallocene-alkyl catalyst compositions, and more particularly to supported metallocene-alkyl catalyst compositions comprising an anti-fouling additive, and also to such a catalyst system useful in producing ethylene homopolymers and copolymers.

BACKGROUND OF THE INVENTION

Metallocene catalysts, those organometallic compounds comprising a Group 4, 5 or 6 metal bound to at least one cyclopentadienyl or ligand isolobal to cyclopentadienyl, are well known olefin polymerization catalysts. While there are many advantages to using metallocenes in olefin polymerizations to produce polyethylenes, there are some drawbacks to using metallocenes. For some time it has been recognized that metallocene catalysts, in particular, supported metallocene catalysts, have poor flowability and tend to adhere to surfaces or to itself. Adding other reagents to the catalyst composition such as commonly known antifouling agents can compound this issue. This causes practical problems in storing, transporting, and then injecting the dry catalyst into a polymerization reactor. There have been some attempts in the art to solve such problems.

In U.S. Pat. No. 5,795,838, flowability problems associated with supported metallocene halides—those metallocenes having at least one halide leaving group bound to the metal center—was addressed by using a catalyst having certain levels of alkyl groups associated with the benzene-insoluble alkylalumoxanes used to form the supported catalyst compositions, and further, to prepolymerized the catalyst prior to using as a dry catalyst. While this was reported to improve flowability, it entails many steps and thus is not advantageous.

In order to address reactor fouling problems caused by high activity metallocene halides, other reagents are often added to the catalyst, either separately or as part of the supported catalyst composition, such as in U.S. Pat. Nos. 6,300,436 and 5,283,278. Such additives, however, often compound the problem of flowability of the catalyst. This problem in turn was addressed in U.S. Pat. No. 6,593,267 though heating the catalyst composition before or while combining with the additive. This solution, however, has still proven somewhat inadequate, as it adds to the cost and complexity of making the catalyst.

The inventors have surprisingly found that the synergistic use of metallocene-alkyls in conjunction with a support material having been calcined at a relatively high temperature (above 600° C.) solves these and other problems. While metallocene-alkyls—those metallocenes having at least one alkyl group bound (often referred to as the "leaving group") to the metal center—are known, such as in E. Giannetti et al., "Homogeneous Ziegler-Natta Catalysts. II. Ethylene Polymerization by IVB Transition Metal Complexes/Methyl Alkylalumoxane Catalyst Systems", in 23 J. POLY. SCI.: POLY. CHEM. ED. 2117-2133 (1985), and in U.S. Pat. No. 5,241,025, what is surprising is that such compounds can be used in conjunction with antifoulant agents to both improve reactor operability and catalyst flowability, as well as overall polymerization activity. The latter is particularly surprising given that it is known that zirconocene-alkyls are not as active as zirconocene-halides under the same conditions and using methalumoxane, as shown by N. V. Semikolenova et al., "On The Interaction of Supported Zirconocene Catalysts With Alkylaluminum Co-Catalysts", in 198 MACROMOL. CHEM. PHYS. 2889-2897 (1997). Nonetheless, the inventors have found such advantages here.

SUMMARY OF THE INVENTION

One aspect of the invention is to a supported catalyst composition comprising an alkylalumoxane, a metallocene-alkyl and an inorganic oxide support having an average particle size of from 0.1 to 50 μm and calcined at a temperature greater than 600° C. In a preferred embodiment, the supported catalyst composition also comprises an anti-foulant agent.

In one embodiment, the supported catalyst composition is produced by combining the metallocene-alkyl with the alkylalumoxane, followed by combining with an inorganic oxide support. In one embodiment, the combining in either step takes place at from 35 to 100° C., and takes place at from 35 to 100° C. in both steps in a more preferred embodiment.

Another aspect of the invention is to a method of polymerizing olefins comprising combining ethylene and optionally at least one α-olefin with a supported catalyst composition comprising an activator, a metallocene-alkyl and an inorganic oxide support having an average particle size of from 0.1 to 50 μm and calcined at a temperature greater than 600° C.; and isolating a polyethylene having a density in the range of from 0.910 to 0.970 g/cm$^3$. In a preferred embodiment the supported catalyst composition also comprises an antifoulant agent.

In one embodiment, the supported catalyst composition is carried into the reactor through a catalyst feeder comprising a tube, the tube having an inside diameter of Δ at time (t+x), where x=0. wherein when x ranges from greater than 0 to 24 hrs, the inside diameter, inclusive of supported catalyst buildup, is ≧0.90 Δ, where "t" is defined at the time at which the supported catalyst composition is first injected through the tube into the polymerization reactor to effectuate polymerization.

These and other aspects of the invention can be combined with the various embodiments disclosed herein.

DETAILED DESCRIPTION OF THE INVENTION

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, "metallocene-alkyl" refers to organometallic compounds comprising a Group 4, 5 or 6 metal bound to at least one, preferably two cyclopentadienyl ligands or ligands isolobal to cyclopentadienyl, where the ligand may be substituted (one or more hydrides replaced) with moieties selected from the group consisting of halogens, $C_1$ to $C_{10}$ alkyls, $C_2$ to $C_{12}$ alkylenes, $C_6$ to $C_{12}$ aryls, $C_1$ to $C_{10}$ alkoxys, —$SiR'_3$,—$NR'_2$, and combinations thereof (R' represents an alkyl group). Metallocene catalyst compounds are generally described in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). Those described herein as "metallocene-alkyls" are characterized as having at least one, preferably two, alkyl groups bound to the metal center, such as is often referred to in the art as the "leaving group" of the metallocene. In one embodiment, the "alkyl" is selected from the group consisting of $C_1$ to $C_{10}$ alkyls and $C_2$ to $C_{10}$ alkylenes; most preferably selected from the group consisting of $C_1$ to $C_8$ alkyls.

The metallocene-alkyls of the present invention may comprise in one embodiment those that are unbridged (I) or bridged (II), as described:

$$Cp^A Cp^B MX_n \qquad (I)$$

$$Cp^A(A)Cp^B MX_n \qquad (II)$$

wherein M is a Group 4, 5 or 6 metal in one embodiment, and is preferably a Group 4 metal, and is even more preferably zirconium or hafnium, and most preferably a hafnium; each X is chemically bonded to M and is an alkyl as described above; each Cp represents a "cyclopentadienyl" group and is chemically bonded to M; and n is 0, 1, 2 or 3, preferably 2. Each Cp may be independently substituted or unsubstituted as described above.

Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentaphenanthreneyl, benzindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$"), substituted versions thereof, and heterocyclic versions thereof. Preferably, the Cp ligands are cyclopentadienyl, indenyl, or tetrahydroindenyl ligands, or substituted versions thereof.

In the metallocene-alkyl represented in (II), (A) a bridging group and is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $—Si(R')_2Si(R'_2)—$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In a preferred embodiment, the metallocene-alkyl is selected from those represented by formula (I); and even more preferably, those represented by formula (I) wherein M is zirconium or hafnium.

In a more preferred embodiment, the metallocene-alkyl is a hafnocene-alkyl. In one embodiment, the hafnocene-alkyl is represented by the formula (III):

$$Cp_n HfX_p \qquad (III)$$

wherein n is 1 or 2, p is 1, 2 or 3, Cp is a cyclopentadienyl ligand bound to the hafnium or a ligand isolobal to cyclopentadienyl or a substituted version thereof; and X is selected from the group consisting of $C_1$ to $C_{10}$ alkyls and $C_2$ to $C_{12}$ alkenyls; X is selected from the group consisting of $C_1$ to $C_5$ alkyls and $C_2$ to $C_6$ alkylenes in a more preferred embodiment, and is a methyl, ethyl or propyl group in a most preferred embodiment; n is 2 and p is 1 or 2, preferably 2. In a most preferred embodiment, each Cp is independently substituted with from one two three groups selected from the group consisting of methyl, ethyl, propyl, butyl, and isomers thereof.

As used herein, the term "antifoulant agent" refers to compounds or mixtures of compounds, preferably solid or liquid, that are useful in gas phase or slurry phase polymerization processes to reduce or eliminate fouling of the reactor, where "fouling" may be manifested by any number of phenomena including sheeting of the reactor walls, plugging of inlet and outlet lines, formation of large agglomerates, or other forms of reactor upsets known in the art. In a preferred embodiment, the antifoulant agent is supported on the inorganic oxide of the supported catalyst composition described herein. Non-limiting examples of antifoulant agents include fatty acid amines, amide-hydrocarbon or ethyoxylated-amide compounds such as described as "surface modifiers" in WO 96/11961; carboxylate compounds such as aryl-carboxylates and long chain hydrocarbon carboxylates, and fatty acid-metal complexes; alcohols, ethers, sulfate compounds, metal oxides and other compounds known in the art. Some specific examples of antifouling agents include 1,2-diether organic compounds, magnesium oxide, ARMOSTAT 310, ATMER 163, ATMER AS-990, and other glycerol esters, ethoxylated amines (e.g., N,N-bis (2-hydroxyethyl)octadecylamine), alkyl sulfonates, and alkoxylated fatty acid esters; STADIS 450 and 425, KEROSTAT CE 4009 and KEROSTAT CE 5009. chromium N-oleylanthranilate salts, calcium salts of a Medialan acid and di-tert-butylphenol; POLYFLO 130, TOLAD 511 (a-olefin-acrylonitrile copolymer and polymeric polyamine), EDENOL D32, aluminum stearate, sorbitan-monooleate, glycerol monostearate, methyl toluate, dimethyl maleate, dimethyl furnarate, triethylamine, 3,3-diphenyl-3-(imidazol-1-yl)-propin, and like compounds. A particularly preferred antifoulant agent is a carboxylate metal compound.

As used herein, a "carboxylate metal compound" refers to compounds comprising a Group 2 to Group 13 atom, in any oxidation state, coordinated with at least one $C_6$ to $C_{30}$ carboxylate. In a preferred embodiment, the carboxylate metal compound comprises a Group 2-6 and Group 13 atom, and even more preferably a Group 2 or Group 13 atom, and even more preferably Mg, Ca, B, or Al; and most preferably aluminum. The carboxylate may comprise a $C_6$ to $C_{25}$ carboxylate in a more preferred embodiment; and may comprise a $C_{10}$ to $C_{22}$ carboxylate in a most preferred embodiment, wherein the hydrocarbon portion may be linear, branched or comprise cyclic moieties. Suitable carboxylate metal compounds are described in, for example, U.S. Pat. No. 6,300,436. Depending upon the metal atom, there may be one, two or more carboxylates bound to the metal center, and further, there may also be other moieties such as hydroxyl and halide groups. The carboxylate metal compound may also exist as dimers or trimers, and may also be hydrated.

As used herein, an "inorganic oxide support" refers to compounds comprising Group 2, 3, 4, 5, 13 and 14 oxides and chlorides. Preferably support materials include silica, magnesia, titania, zirconia, montmorillonite, phyllosilicate, alumina, silica-alumina, silica-chromium, silica-titania, magnesium chloride, graphite, magnesia, titania, zirconia, montmorillonite, phyllosilicate, and the like. Most preferably, the inorganic oxide support is silica. Supports are well known in the art and described by, for example, G. G. Hlatky, "Heterogeneous Single-Site Catalysts for Olefin Polymerization" in 100(4) CHEMICAL REVIEWS 1347-1374 (2000). Preferably, the inorganic oxide support possesses an average particle size in the range of from 0.1 to 50 μm, and more preferably from 1 to 40 μm, and most preferably from 5 to 40 μm.

Calcining of the inorganic oxide support is preferably carried out. Dehydrator or "calcining" apparatuses are well known in the art and any such apparatus can be used in the present invention. In one embodiment, the support is calcined at temperatures ranging from greater than 600° C.; and from greater than 600° C. to 1500° C. in another embodiment; and from 650° C. to 1200° C. in yet another embodiment; and from 650° C. to 1000° C. in yet another embodiment; and from 700° C. to 950° C. in yet another embodiment; and from 800° C. to 950° C. in yet a more particular embodiment, and from 800° C. to 900° C. in yet a more particular embodiment, wherein a desirable range comprises any combination of any upper temperature limit with any lower temperature limit. In one embodiment, calcining takes place in the absence of oxygen and/or moisture by using, for example, an atmosphere of dry nitrogen. In another embodiment, calcining is done in the presence of air (oxygen/nitrogen and optionally carbon dioxide).

As used herein, an "activator" refers to any compound or combination of compounds, supported or unsupported, which can activate a single-site catalyst compound (e.g., metallocenes, Group 15-containing coordination catalysts, etc.), such as by creating a cationic species from the catalyst component, and thus effectuate the polymerization of olefins in conjunction with the single-site catalyst compound. The metallocene-alkyls of the present invention are thus activated towards olefin polymerization using such activators. Embodiments of such activators include Lewis acids such as cyclic or oligomeric poly(hydrocarbylaluminum oxides) ("alkylalumoxanes") and so called non-coordinating activators ("NCA") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as "alkylalumoxanes", examples of which include methalumoxane, triisobutylalumoxane, ethylalumoxane and other such derivatives, and/or ionizing activators (neutral or ionic) such as tri (n-butyl)ammonium tetrakis(pentafluorophenyl)boron and/or a trisperfluorophenyl boron metalloid precursors to activate desirable metallocenes described herein. Methalumoxane and other aluminum-based activators are well known in the art and are most preferred as activators. Ionizing activators are well known in the art and are described by, for example, Eugene Y.-X. Chen and T. J. Marks, *Cocatalysts for Metal-Catalyzed Olefin Polymerization: Activators, Activation Processes, and Structure-Activity Relationships* 100(4) CHEMICAL REVIEWS 1391-1434 (2000). The activator(s) are preferably associated with or bound to a inorganic oxide support, either in association with the metallocene-alkyl or separate from the catalyst component, such as described by G. G. Hlatky, *Heterogeneous Single-Site Catalysts for Olefin Polymerization* 100(4) CHEMICAL REVIEWS 1347-1374 (2000).

Examples of neutral ionizing activators include Group 13 tri-substituted compounds, in particular, tri-substituted boron, tellurium, aluminum, gallium and indium compounds, and mixtures thereof, preferably boron. The three substituent groups are each independently selected from alkyls, alkenyls, halogen, substituted alkyls, aryls, arylhalides, alkoxy and halides. In one embodiment, the three groups are independently selected from halogen, mono or multicyclic (including halosubstituted) aryls, alkyls, and alkenyl compounds and mixtures thereof. In another embodiment, the three groups are selected from alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from alkyls having 1 to 4 carbon groups, phenyl, naphthyl and mixtures thereof. In yet another embodiment, the three groups are selected from highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

In another embodiment, the neutral tri-substituted Group 13 compounds are boron compounds such as a trisperfluorophenyl boron, trisperfluoronaphthyl boron, tris(3,5-di(trifluoromethyl)phenyl)boron, tris(di-t-butylmethylsilyl)perfluorophenylboron, and other highly fluorinated trisarylboron compounds and combinations thereof, and their aluminum equivalents. Other suitable neutral ionizing activators are described in U.S. Pat. Nos. 6,399,532 B1, 6,268,445 B1, and in 19 ORGANOMETALLICS 3332-3337 (2000), and in 17 ORGANOMETALLICS 3996-4003 (1998).

Illustrative, not limiting examples of ionic ionizing activators include trialkyl-substituted ammonium salts such as triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di-(isopropyl)ammonium tetra(pentafluorophenyl)boron, dicyclohexylammonium tetra(pentafluorophenyl)boron and the like; triaryl carbonium salts (trityl salts) such as triphenylcarbonium tetra(phenyl)boron and triphenylcarbonium tetra(pentafluorophenyl)boron; and triaryl phosphonium salts such as triphenylphosphonium tetra(phenyl)boron, triphenylphosphonium tetra(pentafluorophenyl)boron, tri (methylphenyl)phosphonium tetra(phenyl)boron, tri(dimethylphenyl)phosphonium tetra(phenyl)boron and the like, and their aluminum equivalents.

In general, the activator and metallocene-alkyl are combined in mole ratios of activator to catalyst component from 1000:1 to 0.1:1, and from 300:1 to 1:1 in another embodiment, and from 150:1 to 1:1 in yet another embodiment, and from 50:1 to 1:1 in yet another embodiment, and from 10:1 to 0.5:1 in yet another embodiment, and from 3:1 to 0.3:1 in yet another embodiment, wherein a desirable range may include any combination of any upper mole ratio limit with any lower mole ratio limit described herein. When the activator is a cyclic or oligomeric poly(hydrocarbylaluminum oxide), the mole ratio of activator-to-metallocene metal ranges from 2:1 to 1000:1 in one embodiment, and from 10:1 to 500:1 in another embodiment, and from 50:1 to 200:1 in yet another embodiment. When the activator is a neutral or ionic ionizing activator, the mole ratio of activator-to-metallocene metal ranges from 0.5:1 to 10:1 in one embodiment, and from 1:1 to 5:1 in another embodiment.

In one aspect, the present invention is directed to a "supported catalyst composition" comprising an activator, preferably an alkylalumoxane, a metallocene-alkyl, and an inorganic oxide support having an average particle size of from 0.1 to 50 µm and calcined at a temperature greater than 600° C. In a preferred embodiment, the supported catalyst composition also comprises an antifoulant agent. In a most preferred embodiment, the antifoulant agent is a metal carboxylate. The supported catalyst composition is one wherein the metallocene-alkyl, activator and, when present, antifoulant agent are all supported on/or associated with the inorganic oxide support material such that it forms a unitary composition; the individual particles of support will comprise an amount of each component that, on average, can be described in certain ranges. In one embodiment, the supported catalyst composition comprises from 0.010 to 0.10 mmole metallocene (metal) per gram of supported catalyst composition, and from 0.020 to 0.050 mmole metallocene (metal) per gram of supported catalyst composition in another embodiment, and from 0.025 to 0.040 mmole metallocene (metal) per gram of supported catalyst composition in yet another embodiment. The supported catalyst composition comprises from 0.50 to 10 mmole activator (metal) per gram of supported catalyst composition in one embodiment, and from 1 to 8 mmole activator (metal) per gram of supported catalyst composition in another embodiment, and from 2 to 6 mmole activator (metal) per gram of supported catalyst composition in yet another embodiment.

In one embodiment of the supported catalyst composition, the catalyst composition is produced by combining the metallocene-alkyl, preferably a hafnocene-alkyl, with an alkylalumoxane, followed by combining with the inorganic oxide support. The metallocene-alkyl and alkylalumoxane are combined in any suitable solvent, examples of which include hydrocarbon solvents (hexane, pentane, decalin) and aromatic solvents (benzene, toluene). In a particularly preferred embodiment, the alkylalumoxane is such that it is at least 80% soluble in benzene, more preferably at least 90% soluble, and thus described as "benzene soluble" in a particularly preferred embodiment. The combining of the alkylalumoxane and metallocene-alkyl can take place at any desirable temperature; at from 20 to 100° C. in one embodiment, and more preferably from 35 to 100° C., and even more preferably from 40 to 80° C., and even more preferably at from 50 to 75° C.

After combining the metallocene-alkyl with the alkylalumoxane, the thus formed adduct, which may be separated from the diluent it was in or remain therein, is combined further with the inorganic oxide support material to form the metallocene-alkyl composition. This step may take place at any desirable temperature, preferably at from 20 to 100° C. in one embodiment, and more preferably from 35 to 100° C., and even more preferably from 40 to 80° C., and even more preferably at from 50 to 75° C. After reacting for some time, the composition can be dried by any suitable means such as by heating, vacuum, filtration, or a combination thereof. In one embodiment, the composition is decanted or separated in bulk from the diluent and dried at from 60 to 130° C., and dried at from 70 to 100° C. in another embodiment, thus isolating the metallocene-alkyl composition.

In a preferred embodiment, the dried metallocene-alkyl composition is then contacted with the antifouling agent by any suitable means to form the supported catalyst composition. In one embodiment, the metallocene-alkyl composition is combined with solid or liquid antifouling agent by physically blending, mixing, tumbling or other agitation means. Most preferably, the antifoulant agent is a solid and is combined with the solid metallocene-alkyl composition. In a preferred embodiment, the supported catalyst composition comprises from 0.5 to 5 wt % of antifoulant agent by weight of the supported catalyst composition, and from 0.75 to 4 wt % in another embodiment. In a most preferred embodiment, the antifoulant agent is a metal carboxylate.

In a preferred embodiment, the supported catalyst composition is not contacted with ethylene or olefins prior to injecting into a polymerization reactor. That is, the supported catalyst composition is preferably not prepolymerized prior to its use in a polymerization reactor as is known in the art. Thus, the supported catalyst composition is carried into a polymerization catalyst to effectuate the polymerization of olefins in a solid, non-prepolymerized state. In one embodiment, the supported catalyst composition comprising an antistatic agent possesses a bulk density of from 0.30 to 0.50 g/cm$^3$, and from 0.30 to 0.45 g/cm$^3$ in a preferred embodiment. The supported catalyst composition comprising a metal carboxylate is characterized by having improved flow properties; this can be described in one embodiment wherein 20 grams of the supported catalyst composition will flow through a 5 mm diameter funnel at 25° C. and 1 atm. pressure in less than 200 seconds or less than 180 seconds or less than 150 seconds. This test is described in more detail herein.

The supported catalyst composition described herein is capable of continuous introduction into a polymerization reactor, preferably a low pressure polymerization reactor operating at an overall pressure of less than 10,000 kPa, without significant buildup in the catalyst feeder apparatus. Thus, another aspect of the invention is to method of polymerizing olefins comprising combining ethylene and optionally at least one α-olefin with the supported catalyst composition comprising an activator, a metallocene-alkyl, an antifoulant agent and an inorganic oxide support having an average particle size of from 0.1 to 50 µm and calcined at a temperature greater than 600° C.; and isolating a polyethylene having a density in the range of from 0.910 to 0.970 g/cm$^3$.

In a preferred embodiment, the supported catalyst composition comprising the metal carboxylate is carried into, or injected into, a polymerization reactor by means of a catalyst feeder comprising a tube having an inside diameter of "Δ". Preferably, after continued use, the inside diameter of the tube does not substantially change, that is, when taking into account the presence of supported catalyst buildup that may adhere to the inside wall of the tube, the inside diameter of the tube remains substantially constant. In one embodiment, the supported catalyst composition is carried into the reactor through a tube having an inside diameter of Δ at time (t+x), where x=0. wherein when x ranges from greater than 0 or greater than 1 hr. or greater than 5 hrs. to 24 hrs, or 48 hrs., or 5 days, the inside diameter, inclusive of supported catalyst buildup, is ≧0.90 Δ or ≧0.95 Δ or ≧0.98 Δ. Thus, if the time "t" is defined at the time at which the supported catalyst composition is first injected through the tube into the polymerization reactor to effectuate polymerization, any time greater than that is represented by an amount "x". In one embodiment, the inside diameter "Δ" of the tube is such that it's total inside diameter, including that of any supported catalyst composition that may adhere to the surface, is still at least 90% of the inside diameter when x=0.

In one embodiment, the supported catalyst composition is carried into the reactor through a tube having an inside diameter of from 1 to 7 mm, and a diameter of from 1.5 to 5 mm in another embodiment, and from 2 to 4.5 in yet another embodiment. In one embodiment, the supported catalyst composition is carried at a rate of from 0.5 to 5 kg/hr, and at a rate of from 2 to 4 kg/hr in another embodiment.

The present invention is not limited to the type of polymerization reactor used. Preferably, the polymerization reactor useful for effectuating catalysis with the supported catalyst composition is any polymerization reactor operating at from less than 10,000 kPa total pressure. Preferably, the polymerization reactor operates at a partial pressure of ethylene such that the partial pressure of ethylene in the reactor is greater than 1200 kPa, and greater than 1250 kPa in another embodiment, and greater than 1300 kPa in yet another embodiment, and greater than 1350 kPa in yet another embodiment. When operating, the α-olefin is selected from propene, 1-butene, 1-pentene, 1-hexene, 1-heptene and 1-octene in one embodiment, and selected from 1-butene and 1-hexene in a more preferred embodiment.

The "polymerization reactor" can be any type of reactor known in the art that is useful in producing polyolefins and capable of being operated at an overall pressure of less than 10,000 kPa, more preferably less than 8,000 kPa, and even more preferably less than 6,000 kPa, and even more preferably less than 4,000 kPa, and most preferably less than 3,000 kPa. In one embodiment, the reactor is a "continuous" reactor, meaning that monomers and catalyst composition are continually or regularly fed to the reactor while polyethylene is continually or regularly extracted from the reactor. Such polymerization reactors include so called "slurry" reactors, "solution" reactors and "fluidized bed gas phase" reactors. Such reactors are outlined by A. E. Hamielec and J. B. P. Soares in *Polymerization Reaction Engineering—Metallocene Catalysts,* 21 PROG. POLYM. SCI. 651-706 (1996). Most preferably, the polymerization reactor useful in the invention is a continuous fluidized bed gas phase reactor. Such reactors and processes useful in such reactors are well known in the art and described in more detail in U.S. Pat. Nos. 5,352,749, 5,462,999 and WO 03/044061.

In one embodiment, the "polymerization reactor" comprises two or more reactors in series, those reactors being any combination of reactors; preferably the polymerization reactor is one reactor. In another embodiment, the polymerization reactor is a continuous polymerization reactor comprising a feed stream or "cycle gas" comprising the ethylene and, if present, a comonomer, both of which are flowed continuously through the polymerization reactor by any suitable means. The amount of comonomer, if present in the reactor, can be expressed as a molar ratio relative to the amount of ethylene in the reactor. Preferably, the feed stream or "cycle gas" is provided to the reactor to maintain a continuous flow of monomer and optionally comonomer, the ratio stated being a desired steady state level to produce a given type of polyethylene.

In an embodiment of a fluidized bed reactor, a monomer stream is passed to a polymerization section. As an illustration of the polymerization section, there can be included a reactor in fluid communication with one or more discharge tanks, surge tanks, purge tanks, and recycle compressors. In one or more embodiments, the reactor includes a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and at least one other α-olefin, and may also include "condensing agents" as is known in the art and disclosed in, for example, U.S. Pat. No. 4,543,399, 5,405,922, and 5,462,999.

The fluidized bed has the general appearance of a dense mass of individually moving particles, preferably polyethylene particles, as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.5 m/sec and usually no more than 0.76 ft/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. That gas exiting the overhead of the reactor is the recycle gas stream.

The recycle stream is compressed in a compressor and then passed through a heat exchange zone where heat is removed before it is returned to the bed. The heat exchange zone is typically a heat exchanger which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. Nos. 4,933,149 and 6,627,713.

The supported catalyst composition carried to the fluidized bed is preferably stored for service in a reservoir under a blanket of a gas which is inert to the stored material, such as nitrogen or argon. The supported catalyst composition may be added to the reaction system, or reactor, at any point and by any suitable means, and is preferably added to the reaction system either directly into the fluidized bed or downstream of the last heat exchanger (the exchanger farthest downstream relative to the flow) in the recycle line. The supported catalyst composition is carried or injected into the bed at a point above distributor plate. Preferably, the supported catalyst composition is injected at a point in the bed where good mixing with polymer particles occurs. Injecting the catalyst composition at a point above the distribution plate provides satisfactory operation of the embodiment of a fluidized bed polymerization reactor. A catalyst feeder as described above, comprising a tube through which the supported catalyst composition is carried, is most preferred. An inert gas such as argon, nitrogen or other gases that do not react with the supported catalyst composition are used to facility carrying the supported catalyst composition, most preferably a dry solid, through the tube and into the polymerization reactor.

The monomers can be introduced into the polymerization zone in various ways including direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of polyolefin may be conveniently controlled by adjusting the rate of supported catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particular polymer formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas-phase reactor embodiment, the reactor temperature of the fluidized bed process herein ranges from 70° C. or 75° C. or 80° C. to 90° C. or 95° C. or 100° C. or 110° C., wherein a desirable temperature range comprises any upper temperature limit combined with any lower temperature limit described herein. In general, the reactor temperature is operated at the highest temperature that is feasible, taking into account the sintering temperature of the polyolefin product within the reactor and fouling that may occur in the reactor or recycle line(s).

The process of the present invention is suitable for the production of homopolymers comprising ethylene derived units, or copolymers comprising ethylene derived units and at least one or more other olefin(s) derived units. The final polyethylene product may comprise from 0 to 15 or 20 wt % comonomer derived units. Preferably, ethylene is homopolymerized or copolymerized with α-olefins as described above to produce linear low density polyethylenes, preferably those having a density in the range of from 0.910 to 0.970 g/cm$^3$. Such polyethylenes are suitable for such applications as cast films, blow molded films, injection molded goods and blow molded goods.

Another aspect of the invention is directed to the use of a supported catalyst composition comprising an alkylalumoxane, a metallocene-alkyl, an antifoulant agent and an inorganic oxide support having an average particle size of from 0.1 to 50 μm and calcined at a temperature greater than 600° C. In one embodiment, the catalyst composition is produced by combining the metallocene-alkyl with the alkylalumoxane, followed by combining with an inorganic oxide support. In another embodiment, the supported catalyst composition is not contacted with ethylene or olefins prior to injecting into a polymerization reactor. In yet another embodiment, the combining in either step takes place at from 35 to 100° C. In yet another embodiment, the inorganic oxide support is calcined at from 650 to 1000° C. In yet another embodiment, the metallocene-alkyl is a hafnocene-alkyl. And in yet another embodiment, hafnocene-alkyl has the formula:

$Cp_nHfX_p$ wherein n is 1 or 2, p is 1, 2 or 3, Cp is a cyclopentadienyl ligand bound to the hafnium or a ligand isolobal to cyclopentadienyl or a substituted version thereof; and X is selected from the group consisting of $C_1$ to $C_{10}$ alkyls and $C_2$ to $C_{12}$ alkenyls.

Thus, the compositions and processes of the present invention can be described alternately by any of the embodiments disclosed herein, or a combination of any of the embodiments described herein. Embodiments of the invention, while not meant to be limiting by, may be better understood by reference to the following examples.

EXAMPLE SET A

This set of experiments was carried out to demonstrate the advantageous flow properties of the supported catalyst composition of the invention. Aluminum stearate (Crompton Corporation, Memphis, Tenn., #22; $[CH_3(CH_2)_{16}COO]_2AlOH$) was used in the examples below as the exemplary "antifoulant agent". The exemplary "metallocene-alkyl" was bis(n-propylcyclopentadienyl) hafnium dimethyl and can be made by methods known in the art. The exemplary inorganic oxide was silica (Ineos ES-757, average particle size of from 22 to 28 μm by Malvern analysis). The untapped bulk density, and flow characteristics of this sample were measured and recorded in Table 1.

Funnel Test Used for Measuring Flow Properties. The following procedure outlines the steps followed to measure catalyst flowability using the funnel test. Because the catalyst samples tested are air and moisture sensitive, it is necessary to perform the test under anaerobic conditions. These are glass funnels angled at 60 degrees and cut progressively higher to achieve the desired opening size. The funnel sizes used are 14, 12, 10 and 5 mm opening. The catalyst flowability test is conducted inside a glove box at atmospheric pressure. The steps are as follows:
1. Twenty grams of the catalyst sample to be measured is weighed into 14 mm funnel with bottom covered.
2. The stopwatch is started when the bottom cover is removed.
3. The stopwatch is stopped when the entire sample has passed through.
4. The stopwatch time is recorded in the lab notebook and the procedure repeated using a smaller size funnel. If catalyst doesn't flow through certain size funnel, there are no further tests using smaller size funnel.

Example A1

Metallocene-alkyl Catalyst System. Into a 2 gallon (7.57 liters) reactor was charged first with 2.0 liter of toluene then, 1060 g of 30 wt % methylalumoxane solution in toluene (available from Albemarle, Baton Rouge, La.), followed by 22.7 g of bis(n-propylcyclopentadienyl) hafnium dimethyl as a 10% solution in toluene. The mixture was stirred for 60 minutes at room temperature after which 850 g of silica (Ineos ES-757) dehydrated at 650° C. was added to the liquid with slow agitation. Stirring speed was increased for approximately 10 minutes to insure dispersion of the silica into the liquid and then appropriate amount of toluene was added to make up a slurry of liquid to solid having a consistency of 4 cc/g of silica. Mixing was continued for 15 minutes at 120 rpm. Drying was then initiated by vacuum and some nitrogen purge at 175° F. (79.4° C.). When the polymerization catalyst comprising the carrier, silica, appeared to be free flowing, it was cooled down and discharged into a nitrogen purged vessel. An approximate yield of 1.2 Kg of dry polymerization catalyst was obtained.

The supported metallocene catalyst was then blended under a nitrogen atmosphere with 3 wt % (based on the supported catalyst weight) of carboxylate metal compound at room temperature. All manipulations were carried out inside a nitrogen filled glove box.

In a 4 liter flask was weighed 1.0 Kg of catalyst prepared as per Example 2. The metal carboxylate sale (30 g) was added to the flask and the content mixed by rotating the flask gently. Rotation of the flask was continued until the two solids are intimately mixed. A sample of the blended catalyst is taken and the flowability test performed as described above.

Comparative Example A1

Metallocene-halide Catalyst System. Into a 2 gallon (7.57 liters) reactor was charged first with 2.0 liter of toluene then, 1060 g of 30 wt % methylalumoxane solution in toluene (Albemarle, Baton Rouge, La.), followed by 19.6 g of bis(n-propylcyclopentadienyl) hafnium difluoride as a 10% solution in toluene. The mixture was stirred for 60 minutes at room temperature after which 850 g of silica (Ineos ES-757) dehydrated at 650° C. was added to the liquid with slow agitation. Stirring speed was increased for approximately 10 minutes to insure dispersion of the silica into the liquid and then appropriate amount of toluene was added to make up a slurry of liquid to solid having a consistency of 4 cc/g of silica. Mixing was continued for 15 minutes at 120 rpm. Drying was then initiated by vacuum and some nitrogen purge at 175° F. (79.4° C.). When the polymerization catalyst comprising the carrier, silica, appeared to be free flowing, it was cooled down and discharged into a nitrogen purged vessel. An approximate yield of 1.2 Kg of dry polymerization catalyst was obtained.

The supported metallocene catalyst was blended under a nitrogen atmosphere with 3 wt % (based on the catalyst weight) of carboxylate metal compound at room temperature. All manipulations were carried out inside a nitrogen filled glove box.

In a 4 liter flask was weighed 1.0 Kg of catalyst prepared as per comparative Example 1. The metal carboxylate sale (30 g) was added to the flask and the content mixed by rotating the flask gently. Rotation of the flask was continued until the two solids are intimately mixed. A sample of the blended catalyst is taken and the flowability test performed as described above.

Example A2

Catalyst Feeder. A catalyst prepared as per comparative example 1 (metallocene-halide) was loaded into a dry catalyst feeder connected to a gas phase polymerization reactor. The metal catalyst feeder used in this example consists of a chamber incorporating a 20 mesh screen and a metal plate with holes leading to a ⅛inch tubing which carries the dry catalyst into the reactor. The operation is carried out under a nitrogen atmosphere and the dry catalyst is transferred via nitrogen pressure.

Numerous attempts to transfer the catalyst into the reactor to initiate polymerization resulted in pluggage of the feeder screen and the ⅛inch (3.175 mm) transfer tube. Various techniques were used to alleviate the pluggages (increased nitrogen pressure, blow-back, fluffing of catalyst). None of these known methods corrected the catalyst flow problem.

A similar attempt was made on a clean catalyst feeder utilizing the blended catalyst as described in Example A1 (metallocene-alkyl). This time the feeder operated with no problems. The catalyst passed through the 20 mesh screen and transferred through the ⅛inch tubing into the reactor with no issues. The above example demonstrates the advantage of utilizing bis(n-propylcyclopentadiene)hafnium dimethyl instead of the difluoro analog metallocene.

TABLE 1

Flowability Tests for supported catalyst composition comprising aluminum stearate compound and metallocene-alkyl

| Catalyst | Bulk Density, g/cm$^3$ | 10 mm flow time (sec) | 7 mm flow time (sec) | 5 mm flow time (sec) |
|---|---|---|---|---|
| Aluminum stearate, alone | 0.25 | NF | NF | NF |
| Hf—F$_2$ | 0.35 | 2 | 6 | 206 |
| Hf—Me$_2$ | 0.35 | 2 | 6 | 100 |

NF = no flow

Bulk Density (BD) was measured by pouring the supported catalyst composition via a 10 mm diameter funnel into a fixed volume cylinder of 10 cm$^3$. All manipulations are carried out inside a glove box under a nitrogen atmosphere. The bulk density was measured as the weight of composition divided by 10 cm$^3$ to give a value in g/cm$^3$.

EXAMPLE SET B

This set of experiments was carried out to demonstrate how the supported catalyst composition of the invention exhibits advantageously high polymerization activity with respect to ethylene polymerization when the support is calcined at a higher temperature (above 600° C.) and/or when activated/impregnated at a higher temperature.

Calcining. Raw silica was charged to a dehydrator apparatus. A preset program was started to begin the dehydration. A typical ramp rate is as follows: the silica is heated to about 200° C. at a rate of about 50° C. per hour, then held at that temperature for about 2 hours, followed by heating to 600° C. or 650° C. or 875° C. at a rate of about 75° C. 100° C. per hour, followed by holding for about 4 hours at this temperature, all the while under air flow. The air gas flow during the dehydration was preset to 0.08 ft/sec. At the end of the dehydration cycle, the heat was turned off and silica was allowed to cool to room temperature with nitrogen gas flow preset to 0.08 ft/sec. The silica was then discharged into cylinder and kept under nitrogen blanket until used.

Polymerization. The supported catalyst systems described herein were injected into in a continuous gas phase fluidized bed reactor which comprised an 18 inch (45.7 cm) diameter reactor having an internal diameter of 16.5 inches (41.9 cm). The fluidized bed, present in each such type reactor, is made up of polymer granules. The gaseous feed streams of ethylene and hydrogen together with liquid comonomer (1-hexene) were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a constant ethylene partial pressure. The hydrogen was controlled to maintain constant hydrogen to ethylene mole ratio. The concentration of all the gases was measured by an on-line gas chromatograph to ensure relatively constant composition in the recycle gas stream. The solid supported metallocene was injected directly into the fluidized bed using purified nitrogen at about 1.5 lbs/hr (0.68 kg/hr) using a catalyst feeder comprising a tube through which the catalyst was delivered. A pressure of nitrogen effectuated the flow of dry catalyst through the feeder tube. The reacting bed of growing polymer particles was maintained in a fluidized state by the continuous flow of the make up feed and recycle gas through the reaction zone. A superficial gas velocity of 1 to 3 ft/sec (30.5 cm/sec to 91.4 cm/sec) was used to achieve this. The reactor was operated at a total pressure of 300 psig (2069 kPa), a reactor temperature of about 85° C. and a superficial gas velocity of about 2.25 ft/sec (68.6 cm/sec) was used to achieve fluidization of the granules. To maintain a constant reactor temperature, the temperature of the recycle gas is continuously adjusted up or down to accommodate any changes in the rate of heat generation due to the polymerization. The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small stream of humidified nitrogen to deactivate any trace quantities of residual catalyst.

Example B1

A solution of methylalumoxane and bis (n-propylcyclopentadienyl) hafnium difluoride (HfPF) was formed by adding 3000 g of 10 wt % MAO solution in toluene onto 18.58 g of HfPF in a 6 L gallon vessel. The mixture was stirred for 1 hour at room temperature (27° C. to 30° C.). 831 g of Ineos 757 silica dehydrated at 600° C. was then added onto this pre-mixed solution. The resulting slurry was stirred for 1 hour at room temperature (27° C. to 30° C.). The final catalyst was then dried to free-flowing powder under vacuum at 85° C.

Example B2(a)

A solution of methylalumoxane and bis (n-propylcyclopentadienyl) hafnium difluoride (HfPF) was formed by adding 3000 g of 10 wt % MAO solution in toluene onto 18.58 g of HfPF in a 6 L gallon vessel. The mixture was stirred for 1 hour at 50° C. 831 g of Ineos 757 silica dehydrated at 600° C. was then added onto this pre-mixed solution. The resulting slurry was stirred for 1 hour at room temperature 50° C. The final catalyst was then dried to free-flowing powder under vacuum at 85° C.

Example B2(b)

A catalyst composition similar to that in Experiment B2(a) was produced, except the activation and impregnation temperatures were at 75° C.

Example B3

A solution of methylalumoxane and bis (n-propylcyclopentadienyl) hafnium difluoride (HfPF) was formed by adding 3000 g of 10 wt % MAO solution in toluene onto 18.58 g of HfPF in a 6 L gallon vessel. The mixture was stirred for 1 hour at room temperature (27° C. to 30° C.). 831 g of Ineos 757 silica dehydrated at 875° C. was then added onto this pre-mixed solution. The resulting slurry was stirred for 1 hour at room temperature (27° C. to 30° C.). The final catalyst was then dried to free-flowing powder under vacuum at 85° C.

Example B4

A solution of methylalumoxane and bis (n-propylcyclopentadienyl) hafnium dimethyl (HfPMe) was formed by adding 521 g of 30 wt % MAO solution in toluene onto 11.33 g of HfPMe in a 6 L gallon vessel. 950 g of dried toluene was added and the mixture was stirred for 1 hour at room temperature (27° C. to 30° C.). 425 g of Ineos 757 silica dehydrated at 600° C. was then added onto this pre-mixed solution. The resulting slurry was stirred for 1 hour at room temperature (27° C. to 30° C.). The final catalyst was then dried to free-flowing powder under vacuum at 75° C.

In a separate experiment, 3 wt % aluminum stearate was added to this supported catalyst composition as described in Experiment Set A. The resulting catalyst composition was tested in a fluidized bed gas phase reactor as described above. The resultant catalyst productivity ranged from 10,000 to 13,000 lbs PE/lb catalyst.

Example B5

A solution of methylalumoxane and bis (n-propylcyclopentadienyl) hafnium dimethyl (HfPMe) was formed by adding 750 g of 30 wt % MAO solution in toluene onto 16.32 g of HfPMe in a 6 L gallon vessel. 1390 g of dried toluene was added and the mixture was stirred for 1 hour at room temperature 50° C. 612 g of Ineos 757 silica dehydrated at 600° C. was then added onto this pre-mixed solution. The resulting slurry was stirred for 1 hour at room temperature 50° C. The final catalyst was then dried to free-flowing powder under vacuum at 75° C.

Example B6

A solution of methylalumoxane and bis (n-propylcyclopentadienyl) hafnium dimethyl (HfPMe) was formed by adding 980 g of 30 wt % MAO solution in toluene onto 21.33 g of HfPMe in a 6 L gallon vessel. 1790 g of dried toluene was added and the mixture was stirred for 1 hour at room temperature 50° C. 800 g of Ineos 757 silica dehydrated at 875° C. was then added onto this pre-mixed solution. The resulting slurry was stirred for 1 hour at room temperature 50° C. The final catalyst was then dried to free-flowing powder under vacuum at 75° C.

In a separate experiment, 3 wt % aluminum stearate was added to this supported catalyst composition as described in Experiment Set A. The resulting catalyst composition was tested in a fluidized bed gas phase reactor as described above. The resultant catalyst productivity was about 18,000 lbs PE/lb catalyst. Thus, when comparing this with the productivity found in Experiment B4, it is apparent an increased productivity is observed even in the presence of the metal carboxylate, aluminum stearate.

TABLE 2

Activation/Impregnation Temperature Influence

| | | Process Variables | | | Analytical Data | | Activity |
|---|---|---|---|---|---|---|---|
| Example No. | Catalyst description | Activation Temp., ° C. | Impregnation Temp., ° C. | Drying Temp., ° C. | Hf (mmol/g cat) | Al (mmol/g cat) | (g PE/mmol Hf)[1] |
| B1 | Hf—F | 27 | 27 | 80-85 | 0.035 | 3.85 | 76,272 |
| B2 (a) | Hf—F | 50 | 50 | 80-85 | 0.039 | 4.02 | 99,153 |
| B2 (b) | Hf—F | 75 | 75 | 80-85 | 0.037 | 4.52 | 95,455 |
| B4 | Hf—Me | 27 | 27 | 75 | 0.042 | 4.2 | 100,180 |
| B5 | Hf—Me | 50 | 50 | 75 | 0.044 | 4.3 | 99,699 |

[1]The pressure 1517 kPa is the ethylene partial pressure at which the activities were measured.

TABLE 3

Inorganic Support Calcining Temperature Influence

| | | | Analytical Data | | |
|---|---|---|---|---|---|
| Experiment No. | Catalyst description | Calcining Temp., ° C. | Hf (mmol/g cat) | Al (mmol/g cat) | Activity (g PE/mmol Hf)[2] |
| B1 | Hf—F | 600 | 0.036 | 4.4 | 80,962 |
| B3 | Hf—F | 875 | 0.035 | 4.2 | 131,793 |
| B5 | Hf—Me[1] | 600 | 0.044 | 4.3 | 99,699 |
| B6 | Hf—Me[1] | 875 | 0.041 | 4.8 | 134,864 |

[1]This was prepared at 50° C. activation/impregnation temperature.
[2]The pressure 1517 kPa is the ethylene partial pressure at which the activities were measured.

We claim:

1. A supported catalyst composition comprising an alkylalumoxane, a hafnocene-alkyl and an inorganic oxide support having an avenge particle size of from 0.1 to 50 μm and calcined at a temperature of 875° C. or greater.

2. The supported catalyst composition of claim 1, wherein the catalyst composition is produced by combining the hafnocene-alkyl with the alkylalumoxane, followed by combining with the inorganic oxide support.

3. The supported catalyst composition of claim 1, further comprising a metal carboxylate, wherein 20 grams of the supported catalyst composition will flow through a 5 mm diameter funnel at 25° C. and 1 atm pressure in less than 200 seconds.

4. The supported catalyst composition of claim 1, wherein the supported catalyst composition is not contacted with ethylene or olefins prior to injecting into a polymerization reactor.

5. The supported catalyst composition of claim 2, wherein the combining in either step takes place at from 35 to 100° C.

6. The supported catalyst composition of claim 1, wherein the hafnocene-alkyl has the formula:

$$Cp_n HfX_p$$

wherein n is 1 or 2, p is 1, 2 or 3, Cp is a cyclopentadienyl ligand bound to the hafnium or a ligand isolobal to cyclopentadienyl or a substituted version thereof; and X is selected from the group consisting of $C_1$ to $C_{10}$ alkyls.

7. The supported catalyst composition of claim 6, wherein X is selected from the group consisting of $C_1$ to $C_5$ alkyls and.

8. The supported catalyst composition of claim 6, wherein n is 2 and p is 1 or 2.

9. The supported catalyst composition of claim 6, wherein each Cp is independently substituted with from one, two, or three groups selected from the group consisting of methyl, ethyl, propyl, butyl, and isomers thereof.

10. The supported catalyst composition of claim 1, further comprising an antifoulant agent.

11. The supported catalyst composition of claim 10, wherein the antifoulant agent is a metal carboxylate comprising a Group 2 to Group 13 atom coordinated with at least one $C_6$ to $C_{30}$ carboxylate.

12. The supported catalyst composition of claim 11, wherein the metal carboxylate is present in an amount of from 0.5 to 5 wt % of the supported catalyst composition.

13. A method of polymerizing olefins comprising combining ethylene and optionally at least one α-olefin with a supported catalyst composition comprising an activator, a hafnocene-alkyl, and an inorganic oxide support having an average particle size of from 0.1 to 50 μm and calcined at a temperature of 875° C. or greater; and isolating a polyethylene having a density in the range of from 0.910 to 0.970 g/cm³.

14. The method of claim 13, wherein the supported catalyst composition is not contacted with ethylene or olefins prior to injecting into a polymerization reactor.

15. The method of claim 13, wherein the supported catalyst composition is carried into the reactor through a tube having an inside diameter of from 1 to 5 mm.

16. The method of claim 15, wherein the supported catalyst composition is carried at a rate of from 0.5 to 5 kg/hr.

17. The method of claim 13, wherein X is selected from the group consisting of $C_1$ to $C_5$ alkyls.

18. The method of claim 13, wherein each Cp is independently substituted with from one, two, or three groups selected from the group consisting of methyl, ethyl, propyl, butyl, and isomers thereof.

19. The method of claim 13, wherein the inorganic oxide support is calcined at a temperature of from 900 to 1000° C.

* * * * *

UNITED STATES PATENT AND TRADEMARK OFFICE
CERTIFICATE OF CORRECTION

PATENT NO. : 7,323,526 B2
APPLICATION NO. : 11/192935
DATED : January 29, 2008
INVENTOR(S) : Agapios K. Agapiou, Phuong Anh Cao and Sun-Chueh Kao Page 1 of 1

It is certified that error appears in the above-identified patent and that said Letters Patent is hereby corrected as shown below:

In Column 18, Line 60, "avenge" should be deleted, and -- average -- inserted therefore.

In Column 19, Line 21, -- $C_2$ to $C_6$ alkenyls -- inserted after "and" and before ".".

Signed and Sealed this
First Day of February, 2011

David J. Kappos
*Director of the United States Patent and Trademark Office*